United States Patent
Kurtzberg et al.

(10) Patent No.: US 6,360,263 B1
(45) Date of Patent: Mar. 19, 2002

(54) DYNAMIC RESOURCE ALLOCATION FOR USER MANAGEMENT IN MULTI-PROCESSOR TIME SHARED COMPUTER SYSTEMS

(75) Inventors: Jerome M. Kurtzberg; Menachem Levanoni, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/030,432

(22) Filed: Feb. 25, 1998

(51) Int. Cl.$^7$ .............................................. G06F 15/173
(52) U.S. Cl. ...................... 709/226; 709/200; 709/203; 709/229; 709/104; 709/107
(58) Field of Search ................ 709/200–203, 709/223–226, 227–229, 243–244, 100, 103–107; 707/2–3.1, 100–104; 705/7–9

(56) References Cited

U.S. PATENT DOCUMENTS

| | | | | |
|---|---|---|---|---|
| 5,353,339 A | * | 10/1994 | Scobee | 379/207 |
| 5,408,663 A | * | 4/1995 | Miller | 709/104 |
| 5,548,724 A | * | 8/1996 | Akizawa | 709/203 |
| 5,678,041 A | * | 10/1997 | Baker et al. | 709/229 |
| 5,758,157 A | * | 5/1998 | Greenstein et al. | 709/104 |
| 5,822,562 A | * | 10/1998 | Dahlen et al. | 709/100 |
| 5,822,565 A | * | 10/1998 | DeRosa, Jr. et al. | 709/100 |
| 5,838,968 A | * | 11/1998 | Culbert | 709/104 |
| 5,933,604 A | * | 8/1999 | Inakoshi | 709/226 |
| 5,948,065 A | * | 9/1999 | Eilert et al. | 709/226 |
| 5,963,911 A | * | 10/1999 | Walker et al. | 705/7 |
| 5,966,372 A | * | 10/1999 | Wright et al. | 370/329 |
| 5,991,808 A | * | 11/1999 | Broder et al. | 709/226 |
| 5,996,013 A | * | 11/1999 | Delp et al. | 709/226 |
| 6,012,102 A | * | 1/2000 | Shachar | 709/223 |

* cited by examiner

Primary Examiner—Zarni Maung
Assistant Examiner—Bharat Barot
(74) Attorney, Agent, or Firm—Stephen C. Kaufman, Esq.; McGinn & Gibb, PLLC

(57) ABSTRACT

A method suitable for optimizing allocation of resources, in support of k users, in a multi-processor time-shared computer system. The method includes the steps of inputting data comprising current job requirements; operating upon the current job requirements for determining required resources; storing said required resources for subsequent processing by a resource allocator; and executing the required resources for generating a resource allocation for said k users.

21 Claims, 8 Drawing Sheets

| $L(T_j)$ | 50 | 100 | 50 | 100 | 100 |
|---|---|---|---|---|---|
| $K(P_i)$ | 100 | 100 | 100 | 100 | |

| $C_{ij}$ | T1 | T2 | T3 | T4 | T5 |
|---|---|---|---|---|---|
| P1 | 1 | 1 | 0 | 0 | 0 |
| P2 | 0 | 1 | 1 | 0 | 0 |
| P3 | 0 | 1 | 0 | 1 | 1 |
| P4 | 0 | 0 | 0 | 1 | 1 |

| $Y_{ij}$ | T1 | T2 | T3 | T4 | T5 |
|---|---|---|---|---|---|
| P1 | 0.5 | 0.5 | 0 | 0 | 0 |
| P2 | 0 | 0.5 | 0.5 | 0 | 0 |
| P3 | 0 | 0 | 0 | 0.5 | 0.5 |
| P4 | 0 | 0 | 0 | 0.5 | 0.5 | legend:

Fig. 5

Find (Yij) such that:

1. $0 <= Y_{ij} <= 1$ (non-negativity)

2. $\Sigma(Y_{ij}) = 1$, for all i (completeness)

3. $\Sigma(C_{ij}L(T_j))Y_{ij} <= K(P_i)$ (capacity)

4. $\Sigma(C_{ij}K(P_i))Y_{ij} >= L(T_j)$ (coverage)

5. $\max(S(Z_{ij}))$, where $Z_{ij} = 1$ iff $S(|Y_{ij}|) >= 2$

Or

5. $\max(S(C_{ij})\Sigma(\log_2(|Y_{ij}|+1))$ (splitting)

Fig. 6

DYNAMIC RESOURCE ALLOCATION FOR USER MANAGEMENT IN MULTI-PROCESSOR TIME SHARED COMPUTER SYSTEMS

FIELD OF THE INVENTION

This invention relates to an assembly and method suitable for optimizing allocation of resources in a multi-processor time-shared computer system.

INTRODUCTION TO THE INVENTION

In a time shared computer system, each user gets pro-rated computer resources over some interval of time. These resources are various classes of memory and disk storage and, in multi-processor systems, the available CPUs. These resources are limited to no-more than k users for k processors and not all users can be active or even contained in memory at any given time.

SUMMARY OF THE INVENTION

Currently, each user has a priority and is given a fixed slice of computer time in which he does his processing, and then has an inactive period of time during which other users are active. The frequency of user activation is determined by the given user's priority. There is no discipline for the optimal resource allocation in support of a set of k users, based on optimizing computer resource utilization. The problem addressed in this invention is how to optimally allocate computer resources in support of a given number of active users.

We have now discovered novel methodology and an assembly in realization of this methodology, which are responsive and in satisfaction of this problem.

In a first aspect, we disclose an assembly suitable for optimizing allocation of resources in support of k users, in a multi-processor time-shared computer system, the assembly comprising:

(i) a resource monitor comprising:
 (a) means for inputting data comprising current job requirements;
 (b) means for operating upon the current job requirements for determining required resources;
 (c) means for storing said required resources for subsequent processing by a resource allocation;

and (ii) a resource allocator connected to the resource monitor comprising:
 (a) means for inputting, from the resource monitor, said required resources; and
 (b) means for executing the required resources for generating a resource allocation for said k users.

In a second aspect, we disclose a method suitable for optimizing allocation of resources in support of k users, in a multi-processor time-shared computer system, the method comprising the steps of:

1) inputting data comprising current job requirements;
2) operating upon the current job requirements for determining required resources;
3) storing said required resources for subsequent processing by a resource allocator;

and 4) executing the required resources for generating a resource allocation for said k users.

BRIEF DESCRIPTION OF THE DRAWINGS

The invention is illustrated in the accompanying drawings, in which:

FIGS. 5 and 6 are used to reference an Example of the present invention.

DETAILED DESCRIPTION OF THE INVENTION

Figure 1:
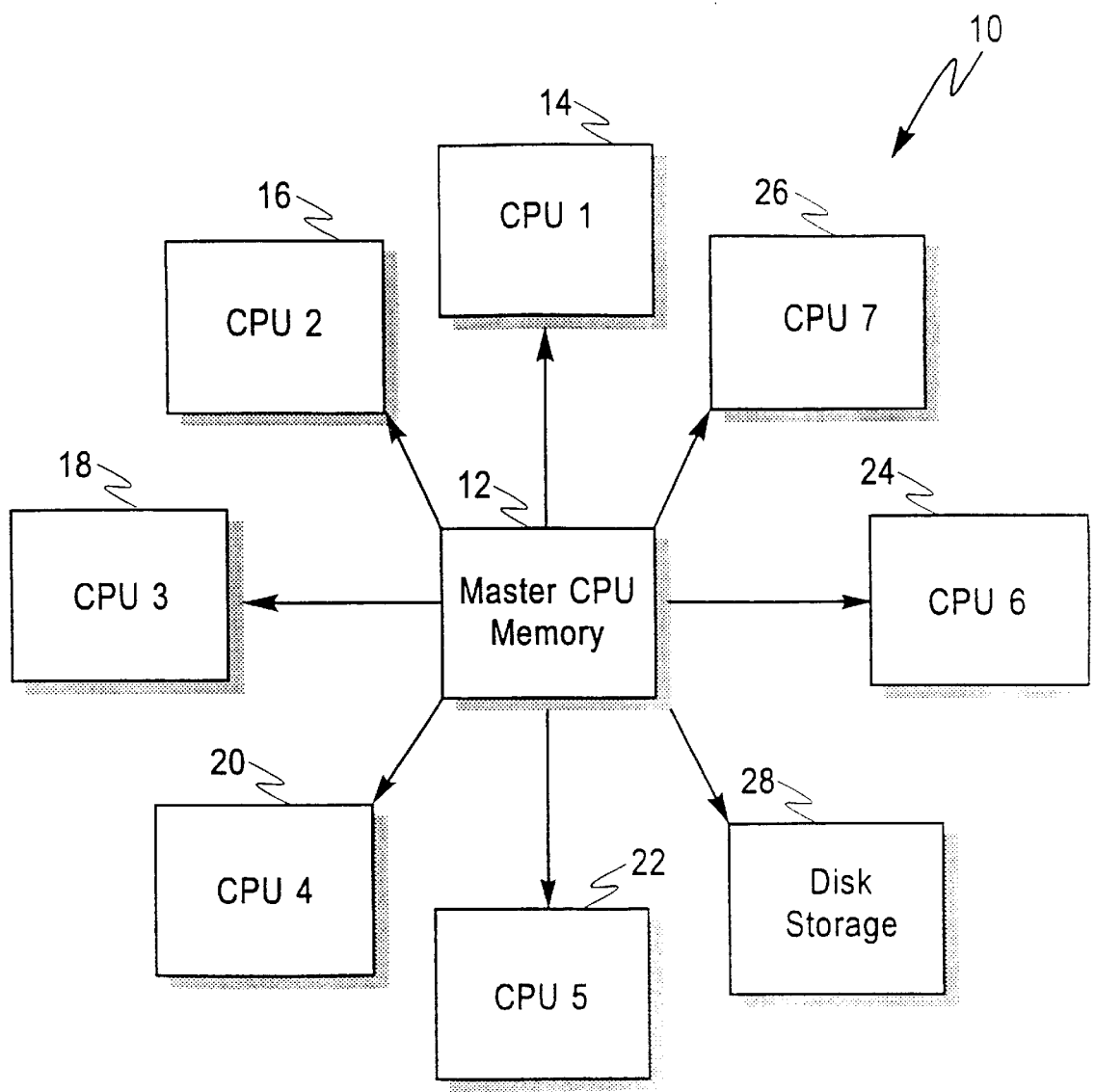
FIG. 1 shows an environment in which an assembly of the present invention may be utilized.
Figure 2A:
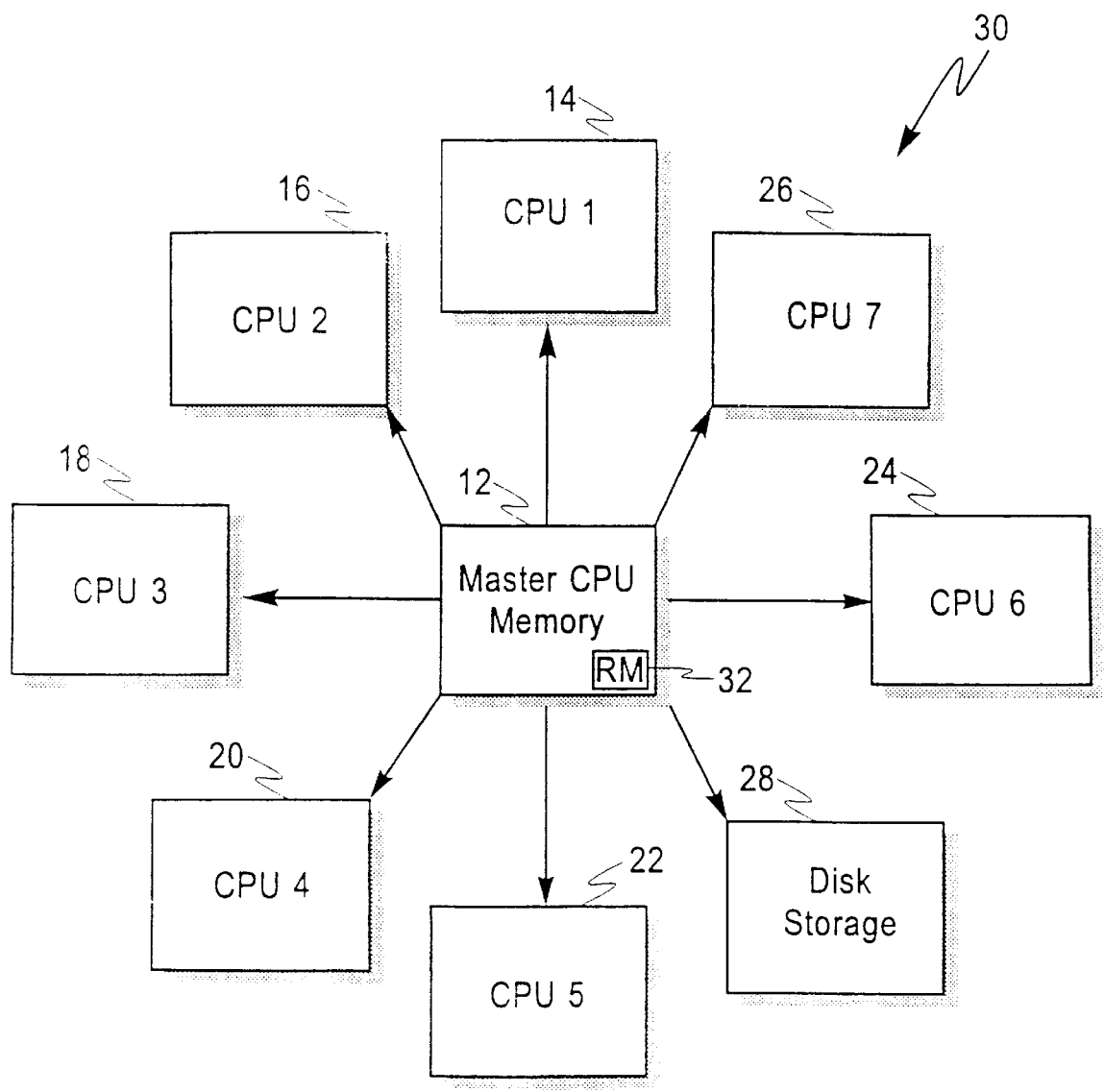
FIGS. 2a–2c show alternative environments that can advantageously incorporate an assembly of the present invention.
Figure 2B:
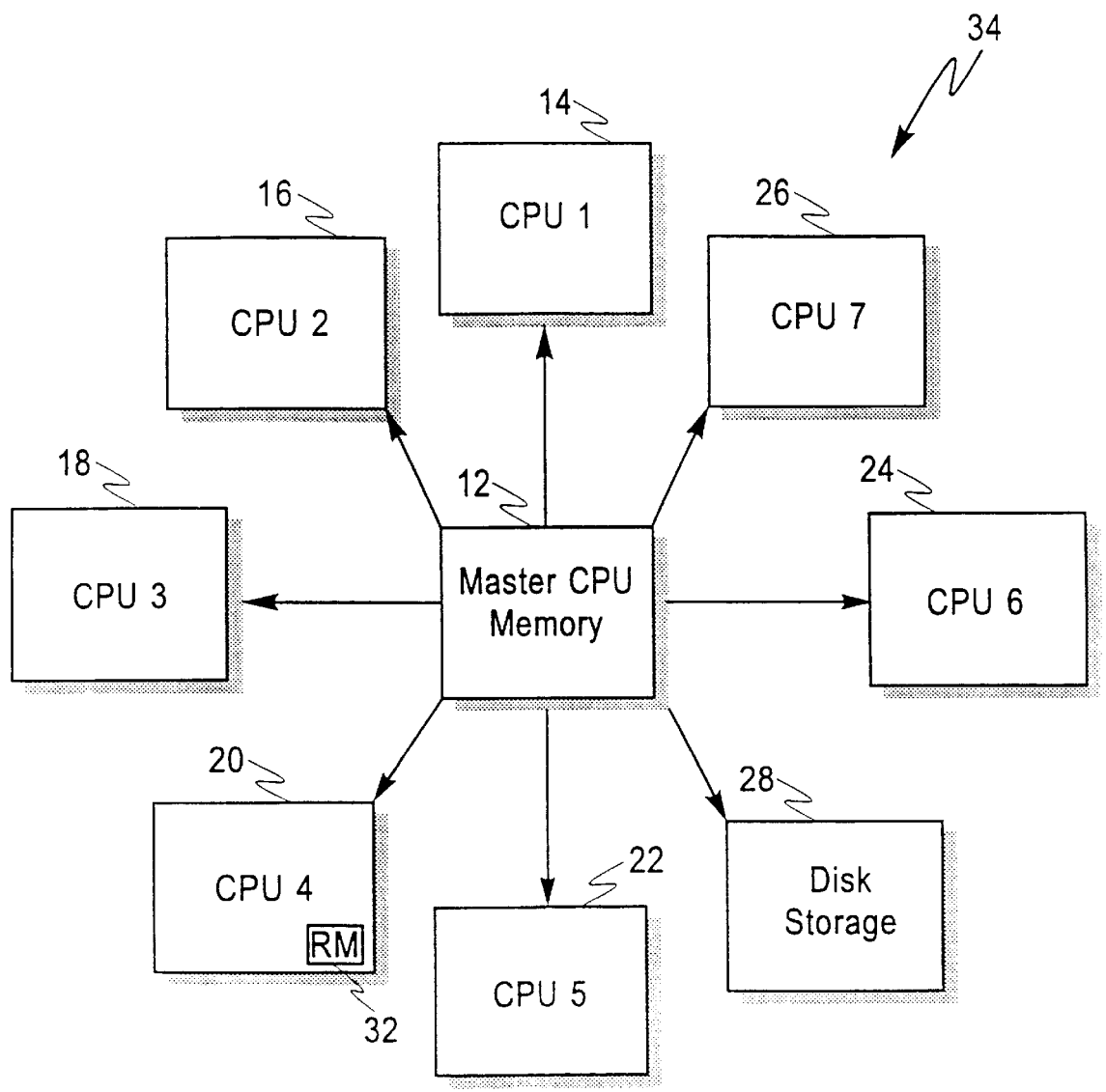
Figure 2C:
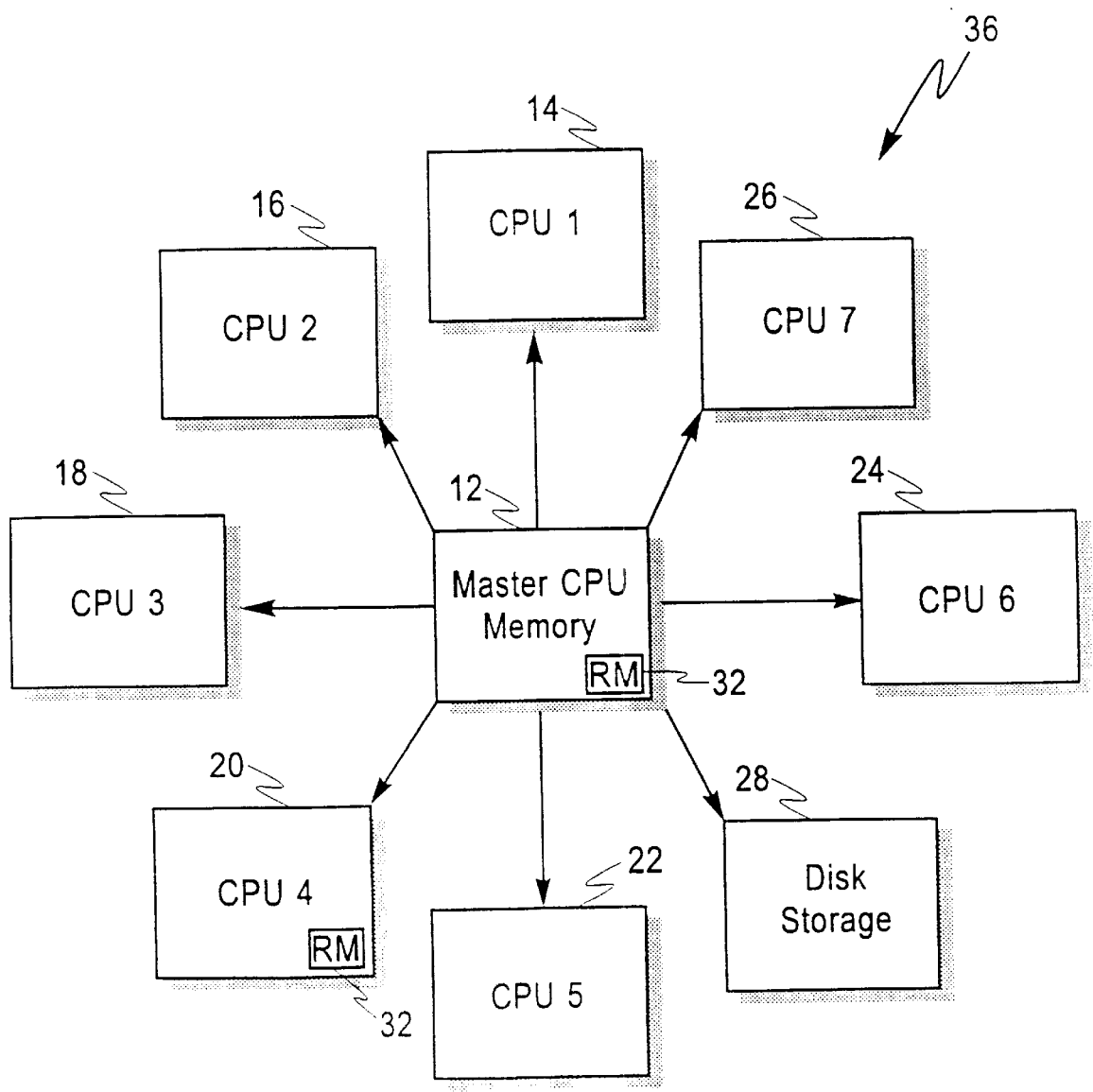

The invention as genus is summarized above. We now turn our attention to preferred species and embodiments subsumed by the genus. In overview, and with reference to FIG. 1, numeral 10, we note that an assembly of the invention is preferably located with reference to a construct that includes a master CPU/main-memory 12 that can interface with a plurality of secondary CPUs 14–26 and external storage 28. In particular, as shown in FIG. 2a, numeral 30, an assembly 32 of the present invention may be located internal to the master CPU 12. Alternatively, as shown in FIG. 2b, numeral 34, an assembly 32 of the present invention may be located internally to a secondary CPU. It is also possible to provide first and second assemblies 32 respectively located in the master CPU 12 and a secondary CPU, as shown in FIG. 2c, numeral 36. For this last situation, for example, the master CPU may request the secondary CPU either assist, take over, or work in tandem with its resident assembly. This may be accomplished by either sending a signal to a designated CPU to take over the job, only assigning subordinate jobs to a designated secondary CPU.

We now turn our attention to details of the assembly 32 referenced in FIGS. 2a–2c. To this end, we reference FIG. 3, numeral 38, and FIG. 4, numeral 40, sequentially.

Figure 3:
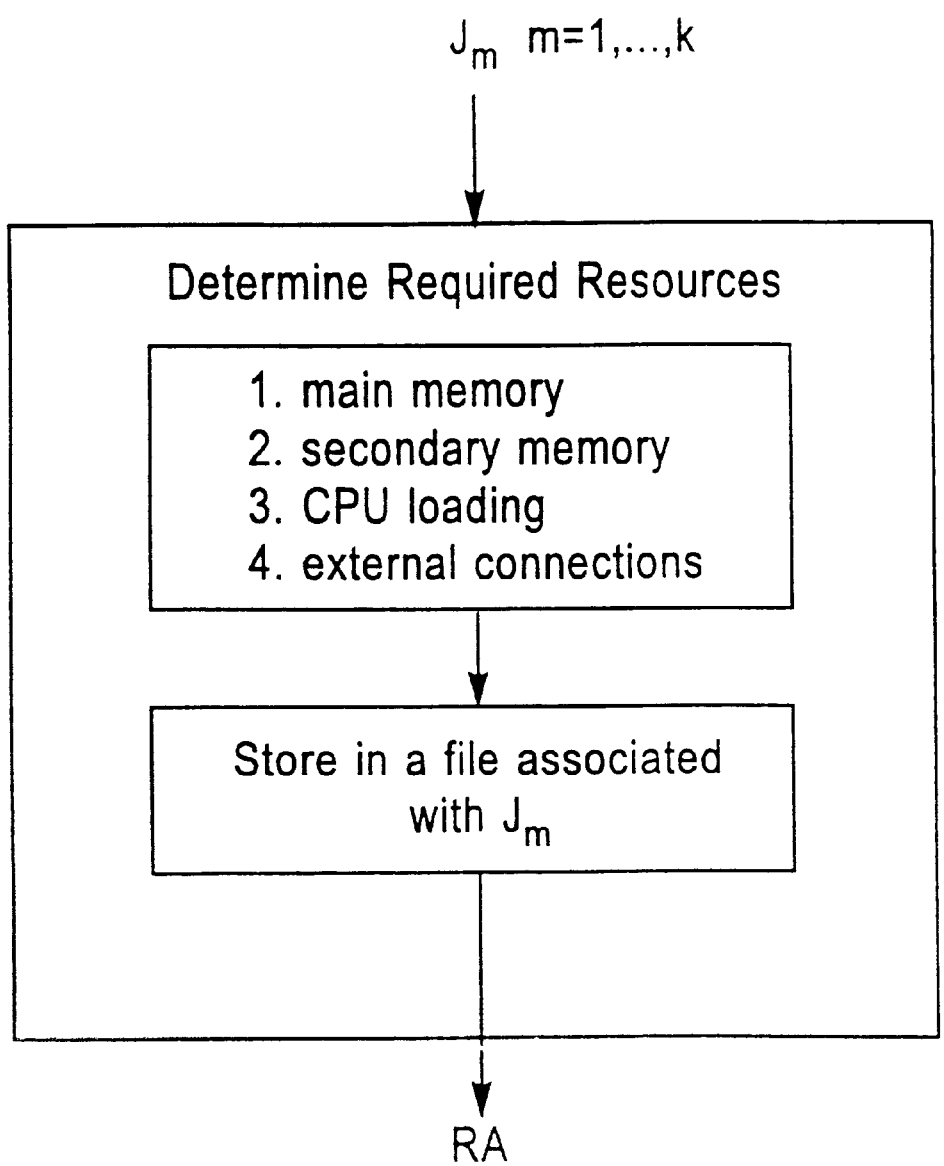
FIGS. 3 and 4 respectively show an assembly of the present invention defining an included resource monitor and a resource allocator.

FIG. 3 comprises a resource monitor (RM). The overall function of the resource monitor is to, on the one hand, accept as input a current job (Jm) for each of k users accessing the computer system of the type shown above in FIG. 1, and, on the other hand, generate an output comprising the required resources to support the k users. This output is to b e subsequently input to a resource allocator (RA), as discussed in detail below and as shown in FIG. 4.

Both the RM and RA reside in memory. The master CPU coordinates the information flow and supplies data to the appropriate section of memory and secures relevant information to supply the RA.

FIG. 3 shows the resource monitor: it specifies four resource types, namely, main memory, secondary memory, CPU loading, and external connections. These resource types are needed to satisfy the requirements of programs and data modules of any user. As indicated above, based upon this information, the resource monitor generates an output to the resource allocator, the output generates an output to the resource allocator, the output comprising the required resources to support the k users.

Figure 4:
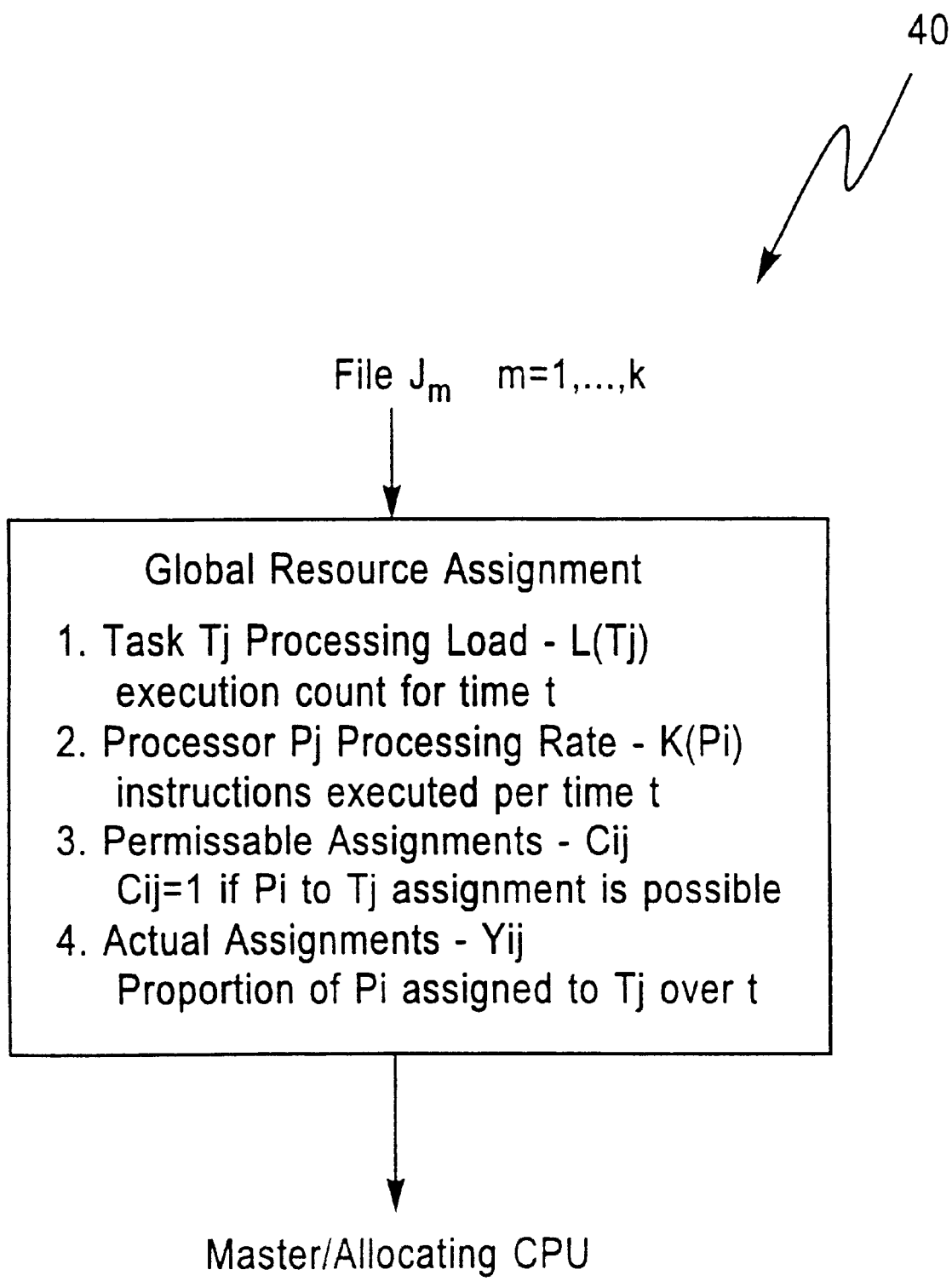

FIG. 4, numeral 40, as indicated above, comprises the resource allocator RA which can accept as input the output of the resource monitor, 38, namely, a file comprising jobs Jm (k=1, . . . , k). In overview, the resource allocator computes the loads of all jobs Jm for the k users in order to allocate them to the available resources. In particular, and to this end, the resource monitor first computes the required resource (load) for each of the jobs (tasks) in support of the k users. Second, the resource monitor accesses information regarding the capacity of each of the available CPU resources. Thirdly and fourthly, the resource monitor utilizes the above information, together with system constraint (e.g., permissible assignments) to make actual task-to-resource assignments which meet all requirements within system constraints.

EXAMPLE

We now provide an example of the present invention. To this end, we make reference to FIGS. 5 and 6. In particular, FIG. 5 depicts an assignment illustration for k=5 users and 4 available CPU resources. For the purpose of this example, it is assumed that the loads required to satisfy each user are: 50, 100, 50, 100, 100 units in arbitrary scale. The capacities of the 4 CPUs are each 100 units in the same scale. Matrix Cij contains permissible assignments where 1 denotes a permissible assignment and 0 denotes impermissible assignment between tasks Tj and processors Pi. Matrix Yij contains actual assignments meeting all requirements and constraints, and derived from the pertinent preferred algorithm specified in FIG. 6.

What is claimed:

1. An assembly suitable for optimizing allocation of resources, in support of k users, in a multi processor time-shared computer system, said assembly comprising:
   a resource monitor comprising:
      an input device for inputting job requirement data for a plurality of jobs;
      a device for deter required resources based on said job requirement data; and
      a storage device for storing said required resources for subsequent processing; and
   a resource allocator connected to said resource monitor comprising:
      an input device for inputting available resources and said required resources from said resource monitor; and
      a device for determining an optimum allocation of resources,
   wherein said optimum allocation is determined according to a predetermined algorithm so that said plurality of jobs are assigned to said processors independent of job priority and in proportion to available processing capacities for said processors.

2. The assembly according to claim 1, wherein said resource monitor and said resource allocator both reside in a memory of said multi-processor time-shared computer system.

3. The assembly according to claim 1, wherein said assembly is operable in a multi-job environment.

4. The assembly according to claim 3, wherein said resource allocator optimally allocates a set of resources to satisfy needs of a set of jobs simultaneously.

5. The assembly according to claim 3, wherein said jobs comprise requests from said k users.

6. The assembly according to claim 3, wherein each resource is selectively operable on more than one job.

7. The assembly according to claim 6, wherein said jobs are selectively divided into sub-jobs for allocation to different resources, to optimize total system operation.

8. The assembly according to claim 1, wherein an output from said resource monitor comprises a file including a plurality of jobs for said k users.

9. The assembly according to claim 8, wherein said resource allocator computes resources of said jobs for the k users to allocate the jobs to available resources, said resources comprising loads of said jobs.

10. The assembly according to claim 1, wherein said assembly is operable in a multi-task environment, tasks comprising at least one of a plurality of jobs and a job divided into sub-jobs.

11. The assembly according to claim 10, wherein said assembly optimally allocates a set of resources to satisfy needs of a set of jobs simultaneously, and wherein each resource is selectively operable on more than one job or more than one sub-job, to optimize total system operation.

12. A method suitable for optimizing allocation of resources in support of k users, in a multi-processor time-shared computer system, the method comprising:
   inputting data comprising job requirement data for a plurality of jobs;
   determining required resources based on said job requirement data;
   storing said required resources for subsequent processing by a resource allocator; and
   determining an optimum allocation of resources; and
   allocating resources according to said optimum allocation,
   wherein said optimum allocation is determined according to a predetermined algorithm so that said plurality of jobs are assigned to said processors independent of job priority and in proportion to available processing capacities for said processors.

13. The method according to claim 12, wherein said inputting and said operating are performed by a resource monitor, and wherein said resource monitor and said resource allocator both reside in a memory of said multi-processor time-shared computer system.

14. The method according to claim 12, wherein said method is operable in a multi-job environment.

15. The method according to claim 14, wherein said executing comprises optimally allocating a set of resources to satisfy needs of a set of jobs simultaneously.

16. The method according to claim 14, wherein jobs in said multi-job environment comprise requests from said k users.

17. The method according to claim 14, wherein each resource is selectively operable on more than one job.

18. The method according to claim 17, wherein said jobs are selectively divided into sub-jobs for allocation to different resources, to optimize total system operation.

19. The method according to claim 12, wherein said method is operable in a multi-task environment, tasks comprising at least one of a plurality of jobs and a job divided into sub-jobs,
   said method further comprising:
   optimally allocating a set of resources to satisfy needs of a set of jobs simultaneously, and wherein each resource is selectively operable on more than one job or more than one sub-job, to optimize total system operation.

20. A time shared computer network system having a plurality of user terminals, said system comprising:
   a resource monitor comprising:
      an input device for inputting job requirement data for a plurality of jobs;
      a processor for determining required resources based on said job requirement data; and
      a memory for storing said required resources for subsequent processing; and a resource allocator connected to said resource monitor comprising:
  an input device for inputting said required resources from said resource monitor; and
  a processor for determining an optimum allocation of resources and allocating said resources according to said optimum allocation,
wherein said optimum allocation is determined according to a predetermined algorithm so that said plurality of jobs are assigned to said processors independent of job priority and in proportion to available processing capacities for said processors.

21. The system according to claim 20, wherein said processor of said resource allocator inputs loads for said plurality of jobs and processing rates for said resources and determines permissible assignments for each job to said resources and actual assignments for each job to said resources.

* * * * *